April 6, 1965  J. DUMPIS  3,177,020
PRE-LUBRICATED SEALED BEARINGS
Filed April 25, 1962  2 Sheets-Sheet 1
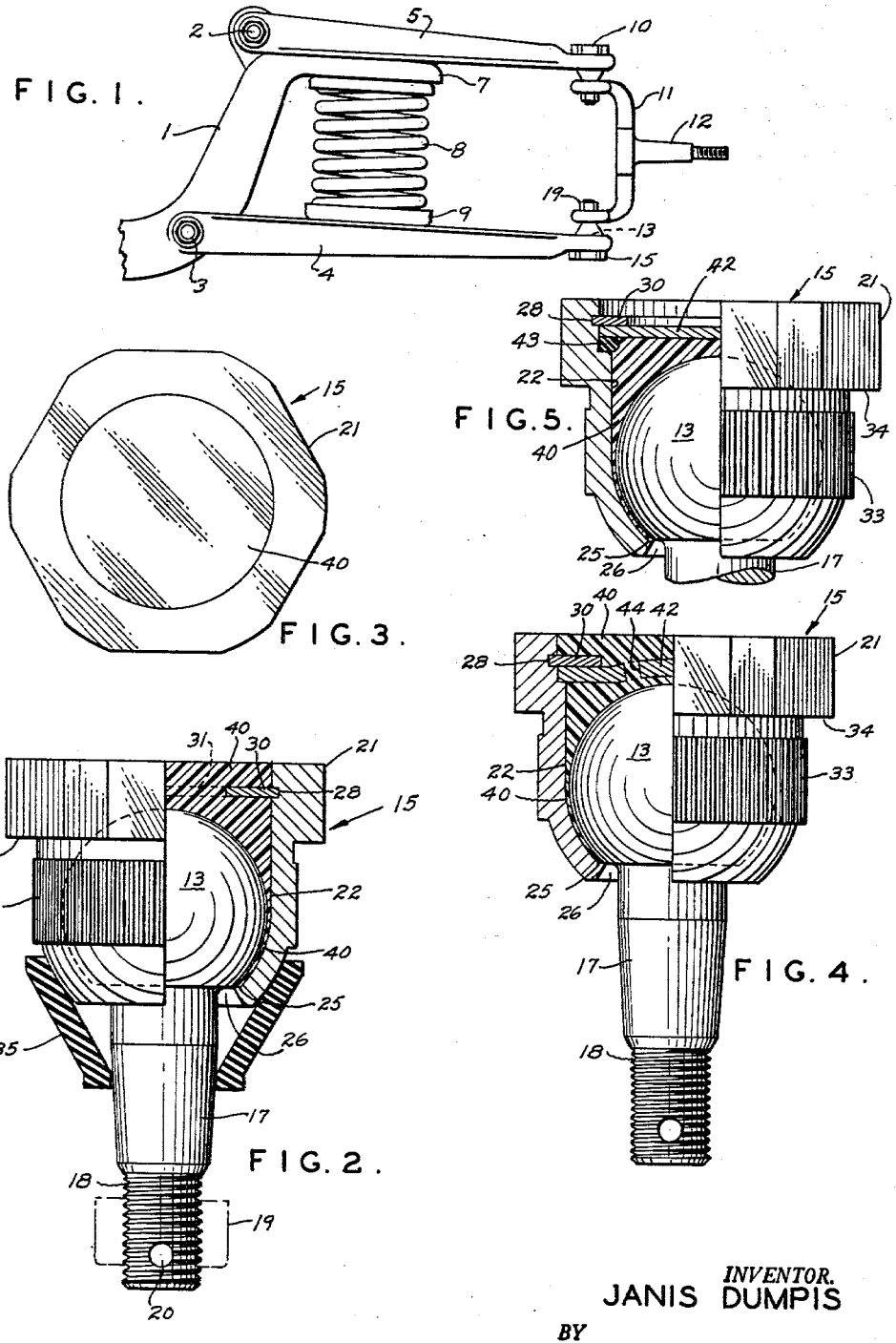
INVENTOR.
JANIS DUMPIS
BY
Sutherland Polster & Taylor
ATTORNEYS April 6, 1965 J. DUMPIS 3,177,020
PRE-LUBRICATED SEALED BEARINGS
Filed April 25, 1962 2 Sheets-Sheet 2

INVENTOR.
JANIS DUMPIS
BY
Sutherland Polster & Taylor
ATTORNEYS

3,177,020
PRE-LUBRICATED SEALED BEARINGS
Janis Dumpis, St. Ann, Mo., assignor to Champ-Items, Inc., St. Louis, Mo., a corporation of Missouri
Filed Apr. 25, 1962, Ser. No. 190,096
1 Claim. (Cl. 287—87)

This invention relates to an improvement in pre-lubricated bearings for articulated joints of the kind used in an articulated linkage system, or the like, and to the method of making an improved form of pre-lubricated bearing for this and other purposes.

Heretofore it has been common practice to manufacture the metal bearing parts of an articulated joint by machine operations on the bearing surface to produce a surface finish with precise accuracy so that the bearing surfaces will have a nice fit, one with the other. This requires manufacturing methods including machine operations on the parts to provide close tolerances and smooth bearing surfaces. When the articulated joint was intended for severe service conditions and/or heavy impact loads, or both, it was usual to heat treat those portions of the parts containing the bearing surfaces so as to prolong their life. Finally, the separate bearing parts were assembled by mechanical interconnection of the parts to form the complete unit ready for installation in an articulated linkage system in which it performed its intended function as an articulated joint or hinge between links in such a system. If the bearing, when assembled, was pre-lubricated, the assembly process included the additional steps of packing and sealing the bearing with the lubricant contained therein.

It is an object of this invention to provide a new form of bearing for this use in which the parts are simpler to manufacture.

It is another object of this invention to provide a new method of assembly for a bearing.

It is another object of this invention to provide a bearing in which finished surfaces to close tolerances are not necessary.

It is still another object of this invention to provide a bearing which is pre-lubricated.

It is still another object of this invention to provide a bearing which is adapted to operate satisfactorily under severe conditions and under loads applied thereto in more than one direction.

According to this invention, the bearing has two principal parts, a male part and a female part for containing the male part. These parts are preferably metal, but unlike other bearings only one of the parts is required to have a surface finish suitable for a bearing surface and close tolerances as to size of the finished bearing surface are unnecessary. In fact, the bearing parts are so sized that the inside of the female part surrounds the outside of the male part in spaced relation. The part of the finished bearing surface is then coated with a mold-release compound, preferably having lubricating qualities, and the bearing filled between the parts with organic molding compound of a character which, when set and cured: provides a smooth interface with the finished bearing surface; has adequate strength; and is stable under the conditions of operation. This can be done by assembling the bearing parts and then charging the molding compound into the space between the parts, or by utilizing the finished bearing part as the core (or shell, as the case may be) of the mold and providing a releasable shell (or core, as the case may be) of size and contour to fit the bearing part having the unfinished surface. The molding compound is thus set in situ at least about (or within) the metal bearing part having the finished surface, and, if not also set in situ within (or about) the other metal part, the organic molded part may readily be fitted into (or about) the unfinished metal part, and secured in place as by cementing. There is also the possibility of charging the female part with organic molding compound and then forcing the male part within the female part. After the molding compound has set and cured (if need be), it forms one of the bearing surfaces, and the finished surface on the metal part, the other bearing surface, in an assembled bearing unit suitable for installation in an articulated linkage system.

The organic molding compound may be any one of a variety of products which set to permanent form and have the requisite physical properties, whether such setting is accomplished by condensation, polymerization, copolymerization, addition or substitution within a mold. Various phenolics, acrylics, formals, furanes, ureas, urethanes, poly-halogenated ethylenes, silanediols and chlorosilanes, having the requisite properties, are well known in the organic plastic molding art, and may be used with or without "filler." The material is preferably one whose setting is irreversible, although thermoplastic material may be used if its softening temperature is safely in excess of the operating temperature to be encountered in use.

Other objects and advantages of the instant invention will appear from the following description which is in such clear, concise and exact terms as will enable any one skilled in the art to make and use the invention when taken with the accompanying drawings, forming a part thereof, in which:

FIG. 1 is an environmental view in front elevation of an articulated linkage showing an automotive application for bearings constructed according to this invention;

FIG. 2 is an elevational view partly in section illustrating a ball joint with a bearing constructed in accordance with this invention;

FIG. 3 is a top plan view of the ball joint shown in FIG. 2;

FIG. 4 is a front elevational view partly in section illustrating a modified form of ball joint with a bearing constructed in accordance with this invention;

FIG. 5 is a front elevational view partly in section illustrating another modified form of ball joint with a bearing constructed in accordance with this invention;

Figure 6:
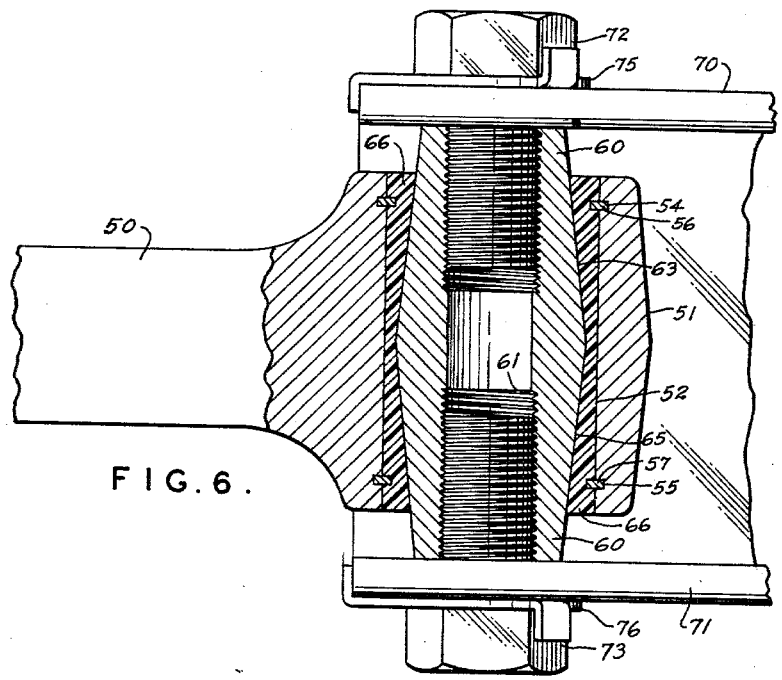
FIG. 6 is a side elevational view of a link member partly in section illustrating another form of bearing according to this invention.

As will be seen from the following description, a bearing member according to this invention can have many different forms, only two of which have been indicated. Both forms shown are particularly adapted to both radial and thrust loads. This particular type of bearing is especially suited to be assembled by the method hereinafter described. The first modification of the invention is a ball joint application. The particular form of the ball joint is one which is adapted to radial loads in all directions and to heavy thrust loading in one direction. A typical example of such a ball joint in a load carrying linkage is shown schematically in FIG. 1.

Turning now to FIG. 1, the chassis of a vehicle, illustrated at 1, has spaced pairs of bearing members 2 and 3 which swingably mount a pair of A-shaped frames 4 and 5. On the chassis 1 is a spring seat 7 upon which the coil spring 8 is held at its upper end. At its lower end, the coil spring 8 seats in a cup 9 integral with the lower link 4. Top link 5 carries a ball joint 10 suspending the upper end of a steering knuckle 11 carrying the wheel spindle 12. The lower end of the steering knuckle 11 carries a ball element 13 of a ball joint the housing of which 15 is secured in the lower A-frame 4 adjacent its end.

The ball 13 and the housing 15 form elements of a ball joint of the type indicated in FIG. 2.

The ball 13 has formed integrally therewith a shank 17 which is tapered and has a reduced portion 18 threaded to receive the nut 19. A hole 20 is provided for a cotter pin. In this modification, the outside of the ball 13 forms one of the bearing surfaces. Consequently, this spherical surface is machined smooth and to relatively close tolerance as to spherical diameter. Housing 15, however, may be a machined part, or a stamping. It is now contemplated to form the housing 15 from hexagonal stock. For example, a piece of hexagonal stock, such as 21, is axially bored, as at 22, to provide a hole diameter which will receive the ball 13 and provide a surrounding space in the range of from a few thousandths to a few hundredths of an inch wide. This should be sufficient clearance in joints wherein the ball 13 is an inch to an inch and a half in diameter. As will be noted from close inspection of FIG. 2, the cylindrical bore within the housing 15 may extend below a line perpendicular to the axis of stem 17 through the center of the ball 13. Preferably the housing 15 has its interior surface forming a continuation of the cylindrical portion 22 cup-shaped complementary to the surface of the ball 13 and the lower edge 25 of the housing 15 surrounding the aperture 26 is preferably provided with a small horizontal shoulder. At the top of the housing 15 is a circumferential ring channel 28 for receiving a split spring ring, or the like, 30 having a central aperture 31. The exterior of the housing 15 is provided with a band of serrations, such as 33, and shoulder 34 spaced from the edge of the band of serrations 33. A conical shaped dust guard 35 of rubber-like material surrounds the stem and the lower portion of the housing. Ball 13 is surrounded except at its stem portion 17 by molded organic material 40 which fills the entire inner space of the housing 15 between the outside surface of the ball 13 and the inside surface of the housing 15.

The joint shown in FIG. 2 is assembled by first coating the bearing surface on the ball 13 with a suitable lubricant, such as a wax, or a lubricant such as a silicone jelly, which is compatible with the chosen organic molding compound and will act as a parting agent. The ball 13 and other parts of the joint are then assembled and the snap ring 30 placed in the channel 28. The housing 15 may then be heated, if need be, to compensate for expected shrinkage of the material 40 during setting. Housing 15 may be precharged with organic molding compound so that a bearing surface is molded therein when the parts are assembled, or the organic molding compound may be charged through the hole 31 in the snap ring 30 to fill the space inside of the housing 15 and between the bearing parts. After the organic molding compound has set, the wax, or silicone jelly, acts as a lubricant, remaining trapped in the ball joint. It is also possible to incorporate a lubricant, such as graphite, in the organic molding material, but, whether this is done or not, the grease coating on the ball 13 cannot escape after the organic compound has set so that the final product is a prelubricated bearing. The ball joint unit, once its filling has set, is sealed for life with the lubricant trapped therein, and the combination of a metal surface on a plastic bearing surface has been found to compare very favorably with the wearing qualities of metal bearing surfaces which have been hardened by heat treatment. In the above modification, only the outer spherical part of the surface of the ball 13 is machined smooth to have a bearing surface. The inside of the casing 15 is not necessarily finished in the same manner since it does not form a part of the bearing, but merely a housing. The clearance between the metal bearing surface and the plastic bearing surface is so small that there is no room for dirt, or water, to penetrate.

The ball joint, shown in FIG. 2, is installed in the arm 4 of FIG. 1 in a hole in the end of the arm dimensioned so that the serrations 33 will have a force fit. This maintains the housing in position in the end of the arm 4 against falling out of the bottom. Shoulder 34 bears against the bottom of the arm 4 and actually supports most of the weight imposed by the chassis 1 on a wheel journalled on the spindle 12.

In the modification shown in FIG. 2, the spring ring 30 performs a double function. In the first place, it retains the ball 13 within the housing 15 mechanically. Also the ring 30 is embedded in the organic filling and acts as a reinforcement and a retainer. This is also the function of shoulder 25.

If it is desirable to construct the ball joint to resist thrust loads in opposite directions axially of the stem 17, it is possible to adopt the construction, such as shown in FIG. 4. In this view, the same reference characters have been used to indicate the same parts and this description will be limited to the difference in construction. The difference between the modification shown in FIG. 4 and that shown in FIGS. 2 and 3 is the addition of an apertured plate 42 in the ring channel 28 below the spring ring 30. This plate 42 may be flat and circular, or it may be provided centrally with a spherical indentation to clear the upper surface of the ball 13. Suitable holes 44 provide for injection of the plastic filler 40 and the filler 40 surrounds the ball 13 in the clearance left between the inside of the housing 15 and the outside of the ball 13. It also fills the space left by the clearance between the inside surface of the plate 42 and the top spherical surface of the ball 13. Apertures 44 may be of the proper size and suitably spaced to permit filling of the space between the bearing parts. Metal plate 42 is the load carrying element supporting the plastic bearing surface at the upper side of the ball 13.

There are many possible ways to assemble a ball joint using an organic molded material according to this invention. FIG. 5 illustrates a construction which is adaptable to another mode of assembly. In this view, the same reference characters have been used to indicate the same parts. Other reference characters than those heretofore used indicate parts which differ. To avoid repetition, this description will be confined to the differences. In this modification, the housing 15 has a shoulder forming a seat for the O-ring 43 compressed beneath the edge of plate 42 which is held in place by the spring snap ring 30 in the ring groove 28. The organic compound 40 fills the cavity between ball 13 and housing 15 up to the bottom of plate 42. This structure may be assembled by simply pouring in the organic filling into the housing 15 around the coated ball 13 and then assembling the plate 42 and ring 30, but there are other ways which could be used which might be more desirable. One of these ways would be to ram a glob of organic molding compound into the housing 15 with a ram type of injector and then assemble the plate 42 and its snap ring 30. The ram would produce enough pressure to produce a permanent set, or the pressure of the ram can be maintained until the organic material has taken a permanent set. It being understood, of course, the ball 13 is first coated as heretofore described. On the other hand, the same results can be obtained by first filling the housing 15 around the coated ball 13 and then applying pressure by a ram to the top surface of plate 42 to compress the filling 40 and the O-ring 43 at the same time to prevent leakage. Again the ram pressure is maintained until the material 40 has taken a permanent set.

Turning now to the modification shown in FIG. 6, this is a combined radial and thrust bearing suitable for use in a steering linkage, for example, at the end of an idler arm where it is journalled to the chassis of the vehicle. Obviously, such a bearing would also be useful to pivotally support the ends of arms 4 and 5 on the chassis of the vehicle. In FIG. 6, an arm 50 is formed with a hollow boss 51 which has a cylindrical inner surface 52 extending axially thereof. This inner cylindrical surface 52 is provided with a pair of ring grooves 54 and 55 for receiving spring rings 56 and 57. These rings have an inner diameter smaller than the cylindrical bore 52 and an outer diameter greater than bore 52 so as to snap into grooves 54 and 55. These rings are snapped into place after the inner bearing 60 is assembled within the cylindrical bore 52. Inner bearing member 60 has an axial threaded bore 61 and a double tapered bearing surface 63 and 65, both of which are conical and have their largest diameter located centrally, or between the ends of the cylindrical bore 52. This bearing is made, or assembled, in the same manner as those heretofore described, for example, the exterior surface of the double tapered bearing 60 is coated with a suitable lubricant compatible with the organic filler to be used. The bearing 60 is assembled within the cylindrical bore and rings 56 and 57 snapped into place within their grooves 54 and 55, respectively. Thereafter, the bearing parts are held in fixed relation while an organic filler 66 is molded in place, or forcibly injected, to fill the space left by the clearance between the exterior of the double tapered bearing and the cylindrical inner bore 52. After the organic filler 66 has set, the bearing 60 will be sealed within the boss 51 and the double tapered surface on the bearing 60 will be rotatable within the double tapered surface formed by the organic filler 66 so that a bearing is made which will be capable of handling thrust radially or axially, and permit the arm 50 to rotate while being maintained in axial fixed relation with respect to the inner double tapered bearing 60.

One manner of mounting this bearing is illustrated in FIG. 6. The chassis 1 carries a pair of spaced ears 70 and 71 aperture to receive a pair of bolts 72 and 73 which are threaded into the bore 61 of the bearing member 60. Deformable lock plates, such as 75 and 76, are held against the outer surfaces of the ears 70, 71 by the bolts 72 and 73, and these deformable plates can be bent to engage with the sides of the ears 70, 71 as well as the heads of the bolts so as to prevent loosening of the bolts 72 and 73.

One of the mechanical features of this bearing is that the bearing part 60 acts as a spacer between the ears 70 and 71. Studs 72 and 73 can be tightened without bending the ears in toward one another. Since any bending of ears 70 and 71 is likely to be non-uniform, there is chance of misalignment if bending occurs. Where parts get out of alignment, rotation of the bearing is restricted. The spacer function of bearing part 60 is therefore important to satisfactory installation.

Figure 7:
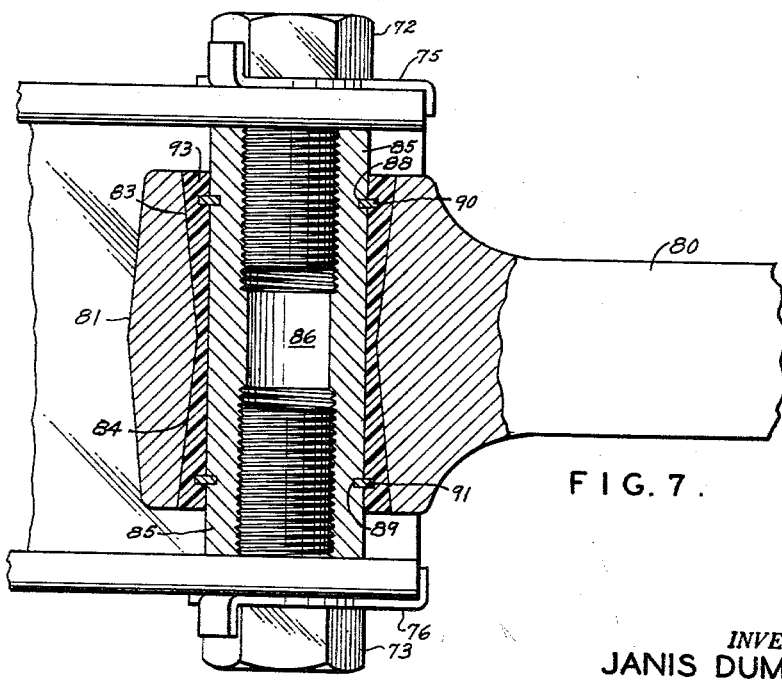
FIG. 7 is a view similar to FIG. 6 illustrating a modified form for the bearing member in FIG. 6.

The modification shown in FIG. 7 differs in several respects from that shown in FIG. 6. According to this view, arm 80 carries a boss 81 which in turn is provided with a double tapered bearing surface 83 and 84. Received within the boss is a cylindrical inner bearing part 85 with a threaded axial bore 86. Opposite ends of the cylindrical bearing part 85 are provided with ring grooves 88 and 89 to receive the split spring rings 90 and 91. In this bearing, the surfaces 83 and 84 are first covered with a suitable grease compatible with the organic filler 93. Cylindrical bearing member 85 is then assembled in the boss 81 and the spring rings 90 and 91 snapped into the grooves. Thereafter the organic filler 93 is molded around the bearing parts, or it is injected into the boss 81 so as to fill the space left by the clearance between the outer cylindrical surface of the bearing 85 and the inner double tapered surface 83 and 84 of the boss 81. In this modification, the bearing surfaces are formed on the inner side of the boss and on the outer surface of the organic filler 93 which will turn with the inner bearing part 85. In all other respects, this modification is the same as that shown in FIG. 6.

All of the modifications herein shown have certain things in common. All are held assembled by molded in situ organic material. In all, the organic filler forms a bearing surface. All are pre-lubricated sealed bearings which require only one finished metal bearing surface, and all are constructed to resist both radial and thrust loads.

Changes in and modifications of the construction described may be made without departing from the spirit of my invention or sacrificing its advantages.

Having thus described the invention, what is claimed and desired to be secured by Letters Patent is:

A thrust bearing of the ball and socket type comprising, (1) a metal housing forming the base and thrust-transmitting portion of the socket part,
(2) a smooth metal ball having a shank projecting axially thereof in the direction which is generally parallel with the depth direction of said housing,
(3) said housing having a larger opening at one extremity of its depth which is at least as large plus clearance as a great circle of said ball, and a smaller opening at the other extremity of its depth which is substantially smaller than said great circle and substantially larger than said shank,
(4) said housing having adjacent its smaller opening a thrust-sustaining interior surface which, with clearance, is roughly contrageneric with the smooth exterior surface of said ball, said contrageneric surface extending, in the depth direction of said housing, for at least about half a radius from said smaller opening,
(5) said housing having adjacent its larger opening an interior surface which, normal to the depth direction of said housing, has no dimension which is smaller than a great circle of said ball, and which extends parallel with said depth direction to a position beyond the great circle of said ball which is normal to said depth dimension,
(6) a moldable plastic material filling the space and set in situ between said ball and said interior surfaces of said housing,
(7) means anchoring said plastic material against movement relative to said thrust-sustaining interior surface of said housing, and
(8) a permanent greasy coating on said ball which is compatible with said moldable plastic material to provide for freedom of movement of said coated surface in said plastic and cooperating therewith to form a seal for said bearing.

References Cited by the Examiner
UNITED STATES PATENTS

| | | | |
|---|---|---|---|
| 1,698,372 | 1/29 | McElroy | 287—100 |
| 1,881,601 | 10/32 | Hufferd et al. | |
| 1,943,631 | 1/34 | Skillman | 29—149.5 |
| 1,960,956 | 5/34 | Riedel | 29—149.5 |
| 2,069,781 | 2/37 | Skillman et al. | 287—93 |
| 2,324,997 | 7/43 | Brown | 308—238 |
| 2,852,287 | 9/58 | Baker | 287—85 |
| 3,009,712 | 11/61 | Williams | 308—238 |
| 3,030,136 | 4/62 | Rowlett | 287—93 |
| 3,081,644 | 3/63 | Hudgens et al. | 264—242 |

ROBERT C. RIORDAN, *Primary Examiner.*

FRANK SUSKO, *Examiner.*